United States Patent
Spremulli et al.

(10) Patent No.: US 10,924,509 B2
(45) Date of Patent: Feb. 16, 2021

(54) CROSS-SITE REQUEST FORGERY PROTECTION

(71) Applicant: salesforce.com, inc., San Francisco, CA (US)

(72) Inventors: Robert Spremulli, Nashua, NH (US); Chris Smith, Burlington, MA (US); Radha Shelat, Lexington, MA (US); Myles T. Frothingham, Acton, MA (US)

(73) Assignee: salesforce.com, inc., San Francisco, CA (US)

(*) Notice: Subject to any disclaimer, the term of this patent is extended or adjusted under 35 U.S.C. 154(b) by 194 days.

(21) Appl. No.: 15/720,871

(22) Filed: Sep. 29, 2017

(65) Prior Publication Data
US 2019/0104135 A1 Apr. 4, 2019

(51) Int. Cl.
H04L 29/06 (2006.01)

(52) U.S. Cl.
CPC .......... H04L 63/168 (2013.01); H04L 63/08 (2013.01); H04L 63/126 (2013.01); H04L 63/1466 (2013.01); H04L 63/1483 (2013.01)

(58) Field of Classification Search
CPC ......... H04L 63/08; H04L 63/10; H04L 63/12; H04L 63/126; H04L 63/14; H04L 63/1441; H04L 63/1466; H04L 63/1483; H04L 63/168
See application file for complete search history.

(56) References Cited

U.S. PATENT DOCUMENTS

| | | | |
|---|---|---|---|
| 2010/0125634 A1* | 5/2010 | Boutboul | G06Q 10/10 709/206 |
| 2013/0167214 A1* | 6/2013 | Sanno | H04L 63/08 726/7 |
| 2015/0195377 A1* | 7/2015 | Elias | H04L 63/08 709/203 |
| 2017/0155712 A1* | 6/2017 | Pang | H04L 67/02 |
| 2017/0359354 A1* | 12/2017 | Matsugashita | H04L 63/08 |
| 2018/0234246 A1* | 8/2018 | Johnson | H04L 9/3236 |

* cited by examiner

Primary Examiner — Jeremy S Duffield
(74) Attorney, Agent, or Firm — Butzel Long

(57) ABSTRACT

Digital data processing systems of the type in which a server digital data device ("server") is coupled to a client digital data device ("client") over a network, e.g., the Internet, include web server software executing within an application layer on the server that responds to a request from the client by (i) validating a key received from the client with that request, (ii) generating a result code indicative of a success of that validation, (iii) initiating processing of the request, including invoking server resource software executing outside the application layer. The server resource software, which checks the result code upon invocation and before performing a protected operation required for processing the request, responds to a result code indicating that the result did not validate by exiting before executing the protected operation.

21 Claims, 2 Drawing Sheets

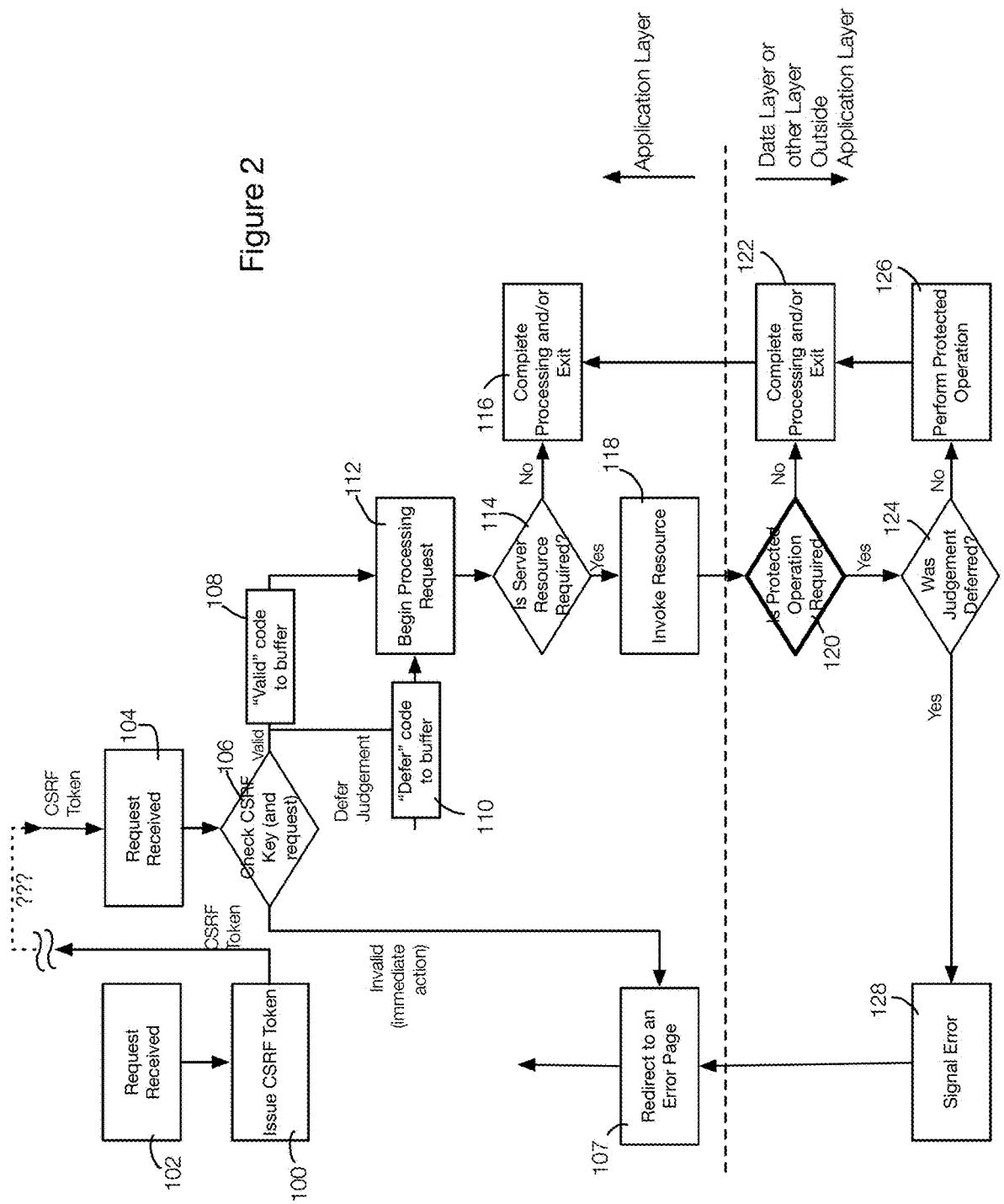

CROSS-SITE REQUEST FORGERY PROTECTION

BACKGROUND

Field of Technology

This pertains to networked digital data processing systems and, more particularly, to the prevention of cross-site request forgeries.

A cross-site request forgery (CSRF, or "sea-surf") is a type of internet attack in which a hacker tricks a victim—typically, a user who is operating a web browser—into submitting a malicious command to a website on which the browser is logged-in or trusted. The hacker's purpose may be to surreptitiously transfer money from the user's account, to change the user's password, or to execute some other protected operation. The hacker never sees the user's browser, but merely uses it as a delivery mechanism for the malicious command.

To help identify CSRF attacks, a web server can generate a time-sensitive key ("CSRF key") each time the browser initiates a session with a server and checking that key within the server with each access. A problem with this is that it results in "false positives" that unnecessarily disrupt the user experience.

Some web servers execute a CSRF framework that requires developers to know which browser requests need protection and to code them accordingly. Operations that merely return data are safe from CSRF attacks, because the hacker does not see the response. Using such frameworks when updating older, legacy web server applications can be problematic, since it requires the developer to add or remove protections on an operation-by-operation basis. This is a slow, manual process and highly error-prone.

BRIEF DESCRIPTION OF THE DRAWINGS

A more complete understanding of the discussion that follows may be attained by reference to the drawings, in which:

FIG. 2 depicts operation of a server of the type shown in FIG. 1 that prevents successful CSRF attacks.

DETAILED DESCRIPTION OF THE ILLUSTRATED EMBODIMENT

Architecture

Figure 1:
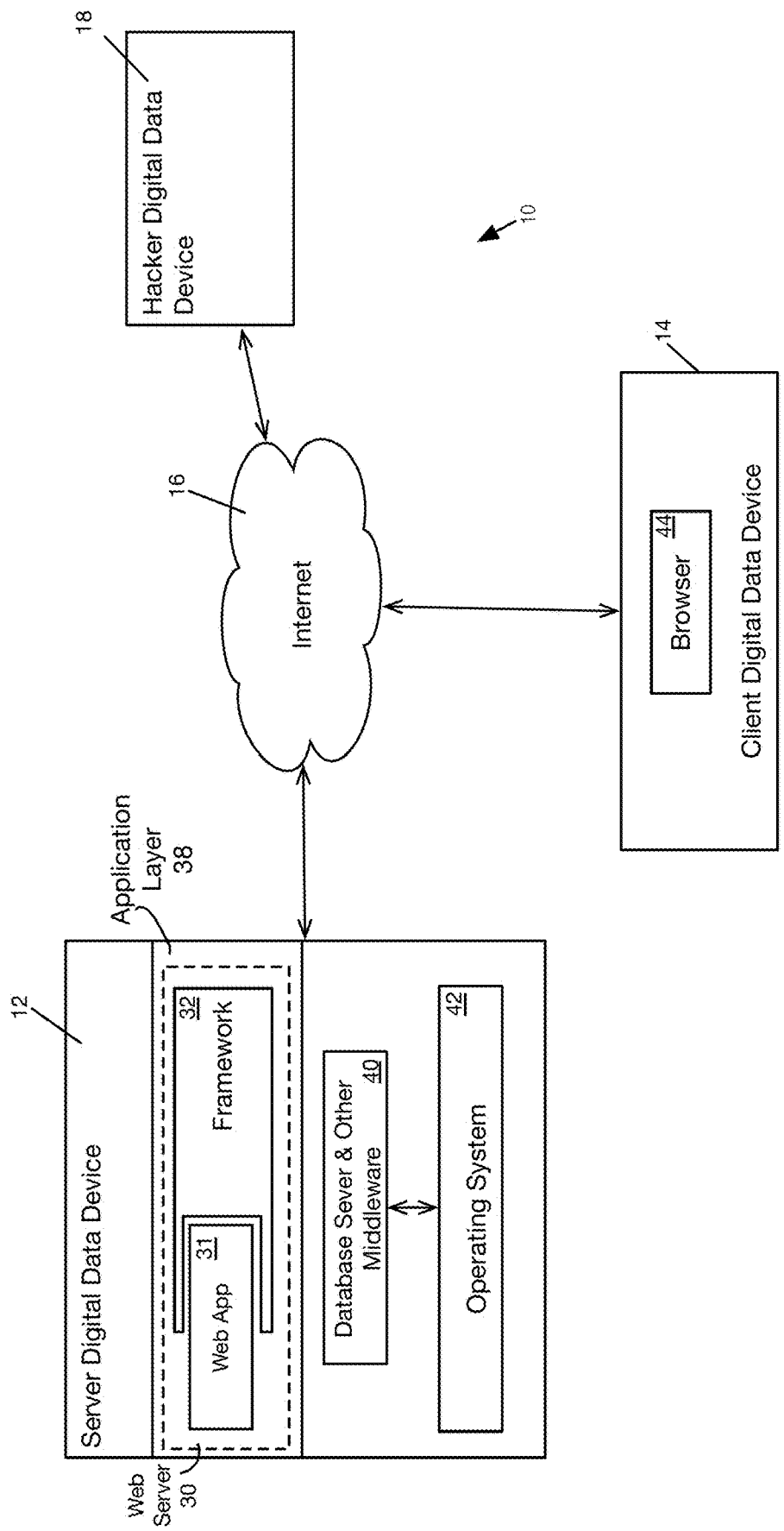
FIG. 1 depicts a digital data processing system of the type providing an example embodiment.

FIG. 1 depicts a digital data processing system 10 of the type providing an example embodiment that includes server digital data device ("server") 12 that is coupled to a client digital data device ("client") 14 via a network 16. Also coupled to client 14 (and, typically, also to serve 12) via network 16 is a hacker digital data device ("hacker") 18.

Devices 12, 14, 18 comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsystems (not shown here) of the type known in the art and suitable for (i) executing software of the type known in the art (e.g., applications software, operating systems, and/or middleware, as applicable) as adapted in accord with the teachings hereof and (ii) communicating over network 16 to one or more of the other devices 12, 14, 18 in the conventional manner known in the art as adapted in accord with the teachings hereof.

Examples of such software include web server 30 that executes on device 12 and that responds to requests in HTTP or other protocols for transferring web pages, downloads and other digital content to a requesting device, e.g., client 14, over network 16—all in the conventional manner known in the art as adapted in accord with the teachings hereof. That digital content may be generated wholly from within server 30, though, more typically, it includes content sourced from elsewhere, e.g., a database server 40 or file system (that forms part of operating system 42) executing on and/or coupled to device 12, again, in the conventional manner known in the art as adapted in accord with the teachings hereof.

In the illustrated embodiment, web server 30 comprises web application 31 executing on device 12 within and/or in connection with a web application framework 32. Web application 31 comprises conventional such software known in the art (as adapted in accord with the teachings hereof) for effecting specific behavior by the server 12 in response to requests from the client 14 at the behest of users thereof. Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, only one of which is shown here (to wit, web application 31).

In the illustrated embodiment, web server 30 and its constituent components, web application 31 and web application framework 32, execute within an application layer 38 of the device 12 software architecture. That layer 38 provides services and supports communications protocols in the conventional manner known in the art as adapted in accord with the teachings hereof.

The application layer 38 of the illustrated embodiment is distinct from other layers in the server architecture—layers that provide services and, more generally, resources (a/k/a "server resources") that are required by the web application 31 and/or framework 32 in order to process at least some of the requests received by server 30 from client 14. Those other layers include, for example, data layer (which provides services supporting interaction with a database server 40 or other middleware in the conventional manner known in the art as adapted in accord with the teachings hereof) and the server's operating system 42 (which manages the server hardware and software resources and provides common services for software executing thereon in the conventional manner known in the art as adapted in accord with the teachings hereof).

In some embodiments, the server resources provided by the "other" layers are effected by processes different from those responsible for the web sever 30 tasks within the application layer. (As those skilled in the art will appreciate, the term "processes" is used here in the sense of CPU and operating system processes, as opposed to the more general sense of that term outside of the computer sciences). Those different processes may be, for example, ones that are asynchronous from one another, or otherwise. In these and other embodiments, the web server 30 and, more particularly, the web application 31 operates in "user space" on the server 12, whereas the server resources execute in "protected space."

Though referred to here as a web server, in other embodiments applications 31 and 32 may define other functionality suitable for responding to client requests for transferring digital content to the requestor over the network 16, e.g., a video server, a music server, or otherwise. And, though shown and discussed here as comprising web application 31 and web framework 32, in other embodiments the web server 30 may combine the functionality of illustrated components 31 and 32 in a single component or distribute it among still more components.

With continued attention to FIG. 1, client device 14 of the illustrated embodiment executes a web browser 44 that typically operates under user control to generate requests in HTTP or other protocols for web pages, downloads and other digital content, that transmits those requests to web server 30 over network 14, and that presents content received from the server application 30 to the user—all in the conventional manner known in the art as adapted in accord with the teachings hereof. Though referred to here as a web browser, in other embodiments application 44 may comprise other functionality suitable for transmitting requests to web server 30 and/or presenting content received therefrom in response to those requests, e.g., a video player application, a music player application or otherwise.

Hacker device 18 executes software (not shown) that initiates a cross-site request forgery (CSRF) attack on client 14. It does this in the manner known in the art, e.g., insertion of malware onto the execution stack of browser 44, to cause it (or other functionality on device 14) to send a surreptitious request to web server 30 (and more particularly, for example, to web application 31) for an operation for which the user of client 14 is authorized (e.g., as reflected by cookies or other codes accessible to browser 44) but not aware, and for which the hacker (and his/her device 18) is not authorized. As noted previously, the hacker may intend to transfer money from the account of the user of device 14, to change that user's password, or to execute some other protected operation, all by way of non-limiting example.

The devices 12, 14, 18 of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although one client device 14 and one hacker device 18 is shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, although in the illustrated embodiment hacker device 18 is coupled to client 14 via network 16, in other embodiments, device 18 or its user may employ other modes of connectivity and/or physical access to subvert client 14.r.

Network 14 comprises one or more networks suitable for supporting communications between server 12, client device 14 and hacker device 18. The network comprises one or more arrangements of the type known in the art, e.g., local area networks (LANs), wide area networks (WANs), metropolitan area networks (MANS), and or Internet(s). Although a client-server architecture is shown in the drawing, the teachings hereof are applicable to digital data devices coupled for communications in other network architectures.

As those skilled in the art will appreciate the "software" referred to herein (including, by way of non-limiting example, in connection with the labels 30, 31, 32, 38, 40, 42, "data layer," "database server," "operating system," and "server resource") comprise computer programs (i.e., sets of computer instructions) stored on transitory and non-transitory machine-readable media of the type known in the art as adapted in accord with the teachings hereof, which computer programs cause the respective digital data devices, e.g., 12, 14 to perform the respective operations and functions attributed thereto herein. Such machine-readable media can include, by way of non-limiting example, hard drives, solid state drives, and so forth, coupled to the respective digital data devices 12, 14 in the conventional manner known in the art as adapted in accord with the teachings hereof.

Operation

Operation of the system 10, and more particularly of the server 12, to prevent a successful CSRF attack on client 14 by hacker 18 is depicted in FIG. 2 and described below.

Referring to that drawing, in step 100 server 12 issues a CSRF key to client 14 in the conventional manner known in the art as adapted in accord with the teachings hereof. Thus, for example, the key can be generated by the server 12 and transmitted to the client 14 over network 16 as part of and/or in response to a HTTP or other request 102 received by server 12 from client 14 for a web page, download or other digital content piece. In the illustrated embodiment, the key (which can be in the form of a "cookie" or otherwise) is encoded with a session- and/or time-based (collectively, "time-based") code. This can be an explicit code or one that is treated implicitly as such by the server 12.

Subsequent to issuance of the key, the server 12 receives a further request from client 14 over network 16 in the conventional manner known in the art as adapted in accord with the teachings hereof. See, step 104. This can be an HTTP or other request for a web page, download or other digital content piece. Per convention, the CSRF key can be included by the client 14 with the subsequent request and/or grabbed by the server 12 in response thereto.

In step 106, server 12 checks the key received with (or grabbed in response to) the subsequent request, as well as (optionally) the request itself. Thus, for example, the server 12 checks any time-based code provided with the key to ensure that it has not expired, as well as any identifying or other information provided with that key, the request itself and/or any sequence or pattern with which the request is received. In the illustrated embodiment, step 106 is performed in the application layer 38 by the web server 30 and, more particularly, by the framework 32 (although, it can be performed by the web application 31 or other functionality in the application layer 38 instead and/or in addition).

In the illustrated embodiment, server 12 (and, more particularly, the web server 30) ceases processing and redirects the client to an error page, if processing of the CSRF key and/or request with which it was received indicates that the request is likely a malicious one—for example, the underlying IP address is a known malicious one and/or the request is received as part of an apparent denial-of-service or other attack. See, "Invalid" branch of step 106 and redirection step 107. Server 12 also takes that branch if the processing at step 106 results in an exception (e.g., a divide-by-zero error or other exception suggesting that the key and/or request is malformed).

Other than instances where processing in step 106 indicates that the request is likely a malicious one (or that the key and/or request are malformed), the server 12 (and more particularly, in the illustrated embodiment, the web server 30) initiates substantive processing of the request. It begins by storing a "result" code indicative of the success of check of the performed in step 106. In instances where that check indicates that the request was not likely a malicious one (nor malformed) and the CSRF code is both valid and unexpired, the server 12 stores a "valid" code in a buffer (or other store) accessible not only by the web server 30 but also by server resources operating outside the application layer 38. See, "Valid" branch of step 106 and step 108. Conversely, where the check in step 106 indicates that the request was not likely a malicious one (nor malformed), but that the CSRF code is either invalid or expired, the server 12 stores a "defer" (or other non-"valid") code in that buffer. See, "Defer Judgement" branch of step 106 and step 110.

Following steps 108 or 110, the server 12 (and more particularly, in the illustrated embodiment, the web server 30) begin substantive processing of the request. See, step 112. Such processing—which includes parsing URLs for parameters, initiating requests for data for customization of requested web pages, construction of HTML and other streams representing those pages, and so forth, all by way of example—proceeds in the conventional manner known in the art, as adapted in accord with the teachings hereof.

If such processing can be handled by web server 30 without use of server resources, e.g., executing outside of the application layer 38, such processing also proceeds to completion and/or exit in the conventional manner known in the art. See, the "No" branch of step 114 and step 116. This is true regardless of whether the check in step 106 revealed discrepancies in the CSRF code, e.g., that it is invalid or expired.

On the other hand, if such processing requires use of server resources, e.g., executing outside of the application layer 38, that resource is invoked in the conventional manner known in the art as adapted in accord with the teachings hereof. See, the "Yes" branch of step 114 and step 118. This may be, by way of example, a resource provided in the data layer for access to a database sever 40 and/or a file system or other resource provided by the operating system 42.

Before such a server resource is invoked, software executing outside the application layer and, more typically, software executing in the layer of server 12 from which that resource is provided and, still more typically, software defining that resource checks whether a protected operation is being invoked. See, step 120. In the illustrated embodiment, that check 120 is performed in a process different from and, in some embodiments, asynchronous with respect to, that in which the web server 30 executes. A protected operation can include, for example, changing stored data defining a password or other user information, effecting a transfer of funds from a user account, or effecting a transfer of information from the user account to any destination other than the browser 44. As noted above, the hacker cannot see the user's browser; hence, the retrieval of information by server 12 for display on browser 44 is generally not considered protected.

If a protected operation of the server resource is not being invoked, processing proceeds to completion and/or exit in both the layer defining the resource and in the application layer in the conventional manner known in the art. See, the "No" branch of step 120 and steps 116, 122. This is true regardless of whether the check in step 106 revealed discrepancies in the CSRF code, e.g., that it is invalid or expired.

On the other hand, if a protected operation of the server resource is being invoked, software executing in the layer of sever 12 from which that resource is provided and, still more typically, software defining that resource checks the result code buffered in steps 108/110 to see if it is "defer" or other non-"valid" code. See, step 124. If not (i.e., if a "valid" code was buffered, indicating success of check of the performed in step 106), the server resource performs the protected operation in the conventional manner known in the art as adapted in accord with the teachings hereof and processing proceeds to completion and/or exit in both the layer defining the resource and in the application layer in the conventional manner known in the art. See steps 126, 122, and 116.

If the check in step 124 reveals that a "defer" or other non-"valid" code was buffered, the resource layer signals an error, ceases processing without performing the protected operation and redirects the client to an error page. See steps 128 and 107.

A server 12 operating as discussed above has numerous advantages. For example, it does not unnecessarily disrupt the experience of a user of client device 14 that makes a protected operation-less request; even if the CSRF code with that request has expired, the request can proceed to completion. It also does not require the developers who write software for web application 31 know which browser 44 requests need protection from CSRF attacks and code them accordingly: software for protecting such operations can be written into the server resources that themselves perform those operations.

Described above are systems, severs and methods meeting the objects set forth above. It will be appreciated that the embodiments described above and shown in the drawings are merely examples of the invention, and that other embodiments varying from those here fall within the scope thereof.

What we claim is:

1. A server digital data device ("server") comprising:
   web server software executing within an application layer on the server,
   the web server software responding to a first and second requests received from one or more client digital data devices (each, a "client") over a network by, for each such request, (i) validating a key encoded with a time-based code and received from the client with that request, (ii) generating a result code indicative of a success of that validation, wherein the result code is a "valid" code if the validation of the key was successful and a "defer" code if the validation of the key was not successful and storing the result code in a buffer accessible outside the application layer (iii) initiating processing of that request, including invoking server resource software executing outside the application layer,
   the server resource software executing outside the application layer and checking the result code stored in the buffer upon invocation and before performing a protected operation required for processing the first request, the result code indicating success of validation of the key received with that first request, and the server resource software responding to that result code being a "defer" code by exiting before executing the protected operation, and
   the server resource software processing the second request without checking the result code indicating success of validation of the key received with the second request, the second request not necessitating a protected operation.

2. The server of claim 1, in which the web server software is any of a web server application and a framework for execution thereof.

3. The server of claim 1, in which the server resource software is any of a database system, a file system and a operating system.

4. The server of claim 1, in which the web server software and the server resource software execute in different processes.

5. The server of claim 4, in which the web server software and the server resource software execute in different processes on the server.

6. The server of claim 1, in which the web server software executes in user space on the server and the server resource software executes in protected space on the server.

7. The server of claim 1, in which the web server software and the server resource software execute asynchronously with respect to one another.

8. The server of claim 1, in which the network is a public network.

9. The server of claim 8, in which the network is the Internet.

10. The server of claim 1, in which at least one of the keys had been generated by the server and sent to the respective client in response to a prior request received from it.

11. The server of claim 1, in which the web server software validates at least one of the keys based, at least in part, on time.

12. The server of claim 1, in which the web server software buffers at least
one of the result codes in a store accessible by the server resource software.

13. The server of claim 1, in which at least one of the requests is generated
by a web application executing on the respective clients.

14. The server of claim 13, in which the web application is a browser.

15. A method of operating a server digital data device ("server") comprising
executing web server software within an application layer on the server,
responding, with the web server software, to a first and second request§, received over a network from one or more client digital data devices (each, a "client") by, for each such request, (i) validating a key encoded with a time-based code and received from the client with that request, (ii) generating a result code indicative of a success of that validation, wherein the result code is a "valid" code if the validation of the key was successful and a "defer" code if the validation of the key was not successful and storing the result code in a buffer accessible outside the application layer, (iii) initiating processing of that request, including invoking server resource software executing outside the application layer,
checking, with the server resource software executing outside the application layer, upon invocation and before performing a protected operation required for processing the first request, the result code stored in the buffer indicating success of validation of the key received with that first request, and responding, with the server resource software, to that result code being a "defer" code by exiting before executing the protected operation, and
with the server resource software, processing the second request without checking the result code indicating success of validation of the key received with the second request, the second request not necessitating a protected operation.

16. The method of claim 15, in which the web server software is any of a web server application and a framework for execution thereof.

17. The method of claim 15, in which the server resource software is any of a database system, a file system and a operating system.

18. The method of claim 15, comprising executing the web server software and the server resource software in different processes.

19. The method of claim 18, comprising executing the web server software and the server resource software in different processes on the server.

20. Computer instructions stored on non-transitory medium configured to cause
a web server executing within an application layer on a server digital data processor ("server") to respond to a first and second requests received from one or more client digital data devices (each, a "client") over a network by, for each such request, (i) validating a key encoded with a time-based code and received from the client with that request, (ii) generating a result code indicative of a success of that validation, wherein the result code is a "valid" code if the validation of the key was successful and a "defer" code if the validation of the key was not successful and storing the result code in a buffer accessible outside the application layer, (iii) initiating processing of that request, including invoking server resource software executing outside the application layer,
the server resource executing outside the application layer and to (i) check, the result code stored in the buffer upon invocation before performing a protected operation required for processing the first request, the result code indicating success of validation of the key received with that first request, and (ii) respond to that result code being a "defer" code by exiting before executing the protected operation, and
the server resource software to process the second request without checking the result code indicating success of validation of the key received with the second request, the second request not necessitating a protected operation.

21. A machine readable non-transitory storage medium having stored thereon a computer program configured to cause a server digital data device ("server") to
perform the steps of:
executing a web server within an application layer on the server to respond to a first and second requests received from one or more client digital data devices (each, a "client") over a network by, for each such request, (i) validating a key received encoded with a time-based code and from the client with that request, (ii) generating a result code indicative of a success of that validation, wherein the result code is a "valid" code if the validation of the key was successful and a "defer" code if the validation of the key was not successful and storing the result code in a buffer accessible outside the application layer, (iii) initiating processing of that request, including invoking server resource software executing outside the application layer,
executing the server resource outside the application layer to (i) check, the result code stored in the buffer upon invocation before performing a protected operation required for processing the first request, the result code indicating success of validation of the key received with that first request, and (ii) respond to a that result code being a "defer" code by exiting before executing the protected operation, and
processing the second request without checking the result code indicating success of validation of the key received with the second request, the second request not necessitating a protected operation.

\* \* \* \* \*